(12) United States Patent
Herman et al.

(10) Patent No.: US 9,428,094 B2
(45) Date of Patent: Aug. 30, 2016

(54) TRANSPORT APPARATUS FOR ELONGATE OBJECTS

(75) Inventors: Alvin Herman, Saskatoon (CA); Erin Herman, Saskatoon (CA)

(73) Assignee: Quickthree Solutions, Inc., Saskatoon (CA)

( * ) Notice: Subject to any disclaimer, the term of this patent is extended or adjusted under 35 U.S.C. 154(b) by 262 days.

(21) Appl. No.: 14/131,311

(22) PCT Filed: Jun. 6, 2012

(86) PCT No.: PCT/CA2012/000551
§ 371 (c)(1),
(2), (4) Date: Feb. 20, 2014

(87) PCT Pub. No.: WO2013/003940
PCT Pub. Date: Jan. 10, 2013

(65) Prior Publication Data
US 2014/0169920 A1    Jun. 19, 2014

(30) Foreign Application Priority Data

Jul. 7, 2011 (CA) ..................................... 2745682

(51) Int. Cl.
*B65D 88/30* (2006.01)
*B60P 1/28* (2006.01)
(Continued)

(52) U.S. Cl.
CPC ................ *B60P 1/28* (2013.01); *B60P 1/6427* (2013.01); *B60P 3/40* (2013.01); *B65D 88/30* (2013.01); *Y10S 414/132* (2013.01)

(58) Field of Classification Search
CPC ........................... B65D 88/30; Y10S 414/132
USPC .................................................. 414/332, 919
See application file for complete search history.

(56) References Cited

U.S. PATENT DOCUMENTS 3,208,616 A * 9/1965 Haskins ................ B65D 88/30
                                                       414/332
3,450,281 A * 6/1969 Groberg ............... A01D 85/005
                                                       414/436
(Continued)

FOREIGN PATENT DOCUMENTS

CA    2254702 A1 * 6/2000 ................ B60P 1/56
CA    2712692         2/2012
(Continued)

OTHER PUBLICATIONS

Novakovic, Zoran, International Search Report, Sep. 10, 2012, Canadian Intellectual Property Office, Canada.

*Primary Examiner* — James Keenan
(74) *Attorney, Agent, or Firm* — Trego, Hines & Ladenheim, PLLC; Brandon Trego; Jonathan Hines

(57) ABSTRACT

A transport apparatus for moving an elongated object includes a trailer frame with a tilting rear frame section pivotally attached to a front frame section. Rear wheels are mounted under the rear frame section rearward of the tilt axis, and an actuator pivots the rear frame section upward about the tilt axis from a horizontal lowered position to a vertical raised position. An engagement mechanism on a rear end of the rear frame section rearward of the rear wheels moves downward into engagement with a receiver on the object when the rear frame section moves upward. When the rear frame section moves upward to the raised position adjacent to the object, the rear wheels are raised above the ground. A lock secures the object to the tilting rear frame. Moving the tilting rear frame section downward moves the object downward to a horizontal transport position resting on the trailer frame.

10 Claims, 6 Drawing Sheets

(51) Int. Cl.
*B60P 1/64* (2006.01)
*B60P 3/40* (2006.01)

(56) References Cited

U.S. PATENT DOCUMENTS

| | | | | |
|---|---|---|---|---|
| 3,618,801 A | * | 11/1971 | Blanchard | B60P 3/00 |
| | | | | 298/19 B |
| 3,687,319 A | * | 8/1972 | Adam | B60P 1/483 |
| | | | | 414/467 |
| 3,792,790 A | * | 2/1974 | Brubaker | B65D 88/30 |
| | | | | 198/359 |
| 4,163,626 A | | 8/1979 | Batterton et al. | |
| 4,337,014 A | | 6/1982 | Farnham | |
| 4,415,300 A | * | 11/1983 | Boddicker | B60P 1/18 |
| | | | | 298/20 R |
| 4,621,972 A | | 11/1986 | Grotte | |
| 4,626,166 A | | 12/1986 | Jolly | |
| 4,708,569 A | * | 11/1987 | Nijenhuis | B60P 1/64 |
| | | | | 414/332 |
| 4,944,646 A | * | 7/1990 | Edwards | B28C 9/0418 |
| | | | | 280/6.157 |
| 4,954,039 A | * | 9/1990 | Johnston | B60P 1/18 |
| | | | | 296/183.2 |
| 4,958,978 A | | 9/1990 | Shedleski | |
| 5,967,733 A | * | 10/1999 | Cash | B62D 63/062 |
| | | | | 414/483 |
| 6,589,005 B1 | * | 7/2003 | Hull | B60P 3/07 |
| | | | | 280/456.1 |
| 2007/0207017 A1 | | 9/2007 | Boasso et al. | |

FOREIGN PATENT DOCUMENTS

| | | | | |
|---|---|---|---|---|
| DE | 3610263 A1 | * | 10/1986 | B65D 88/30 |
| FR | 2690678 A1 | * | 11/1993 | B65D 88/30 |

* cited by examiner

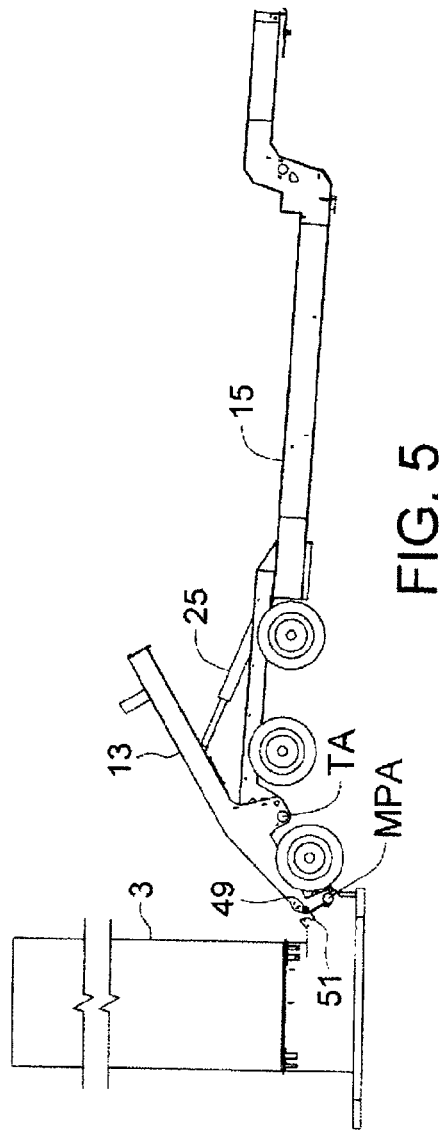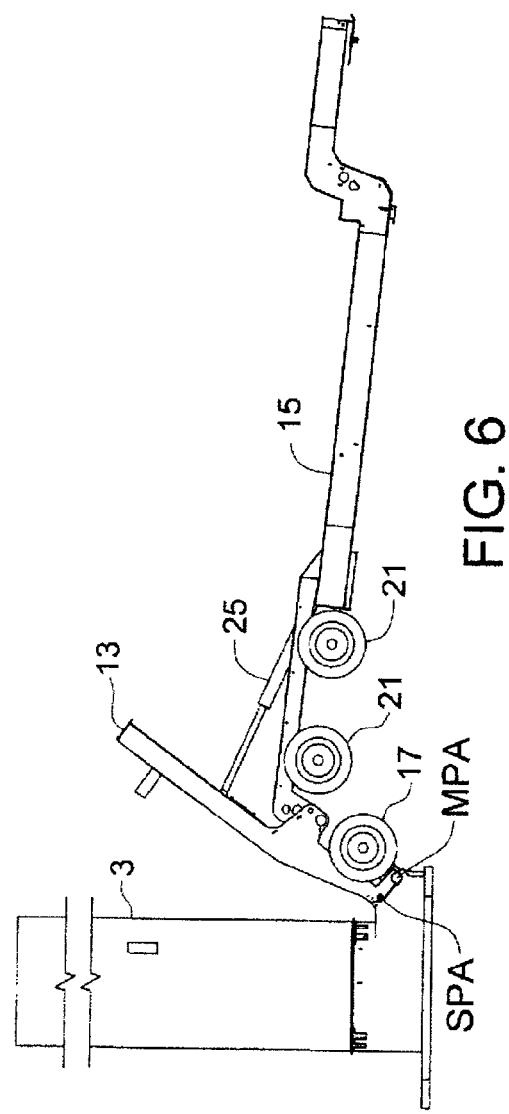

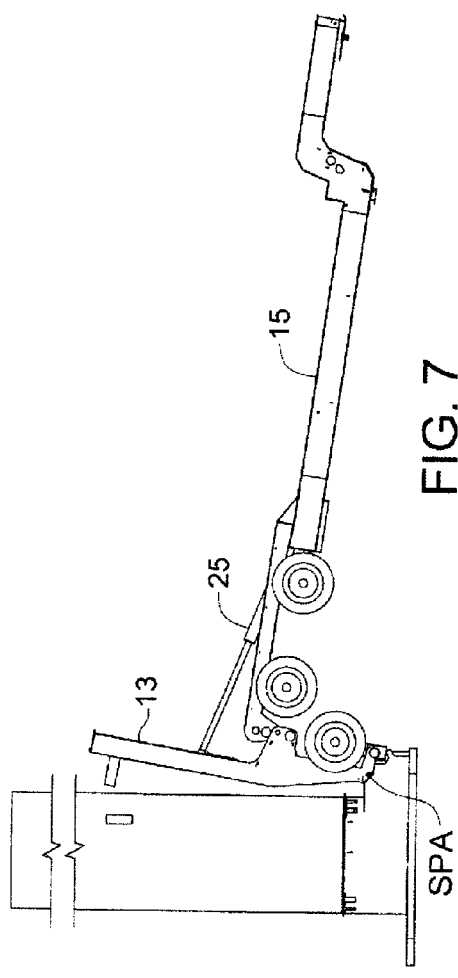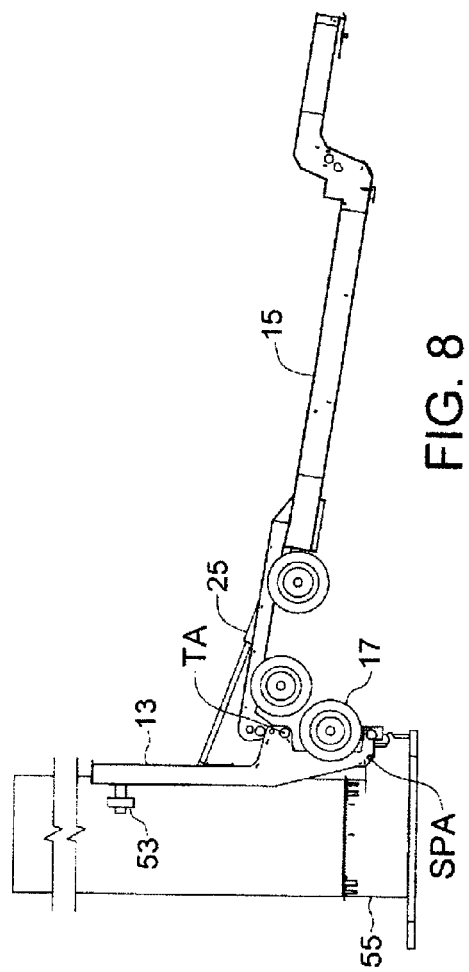

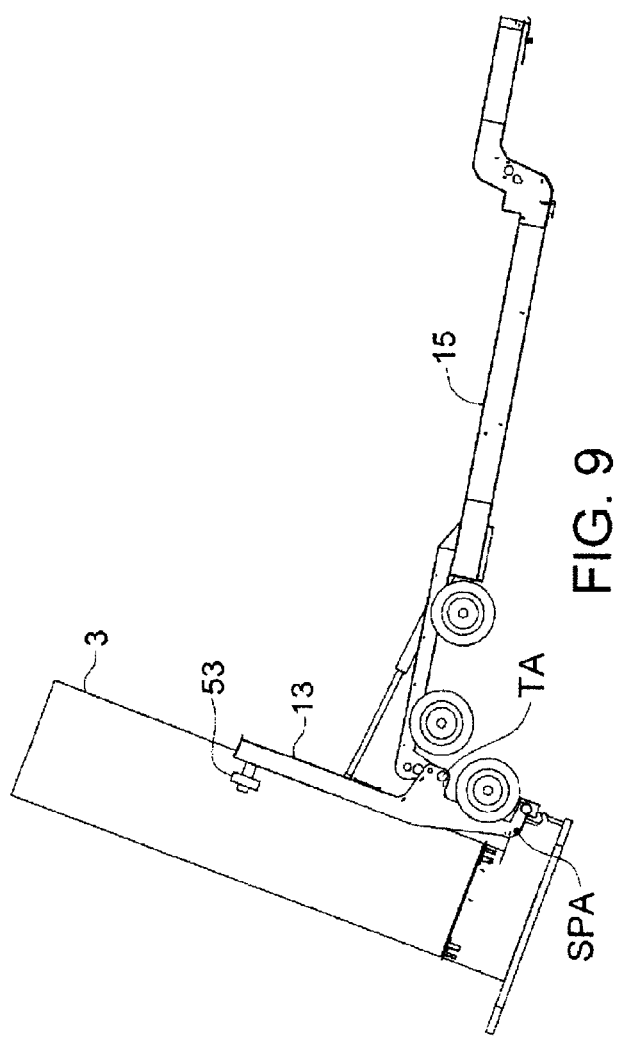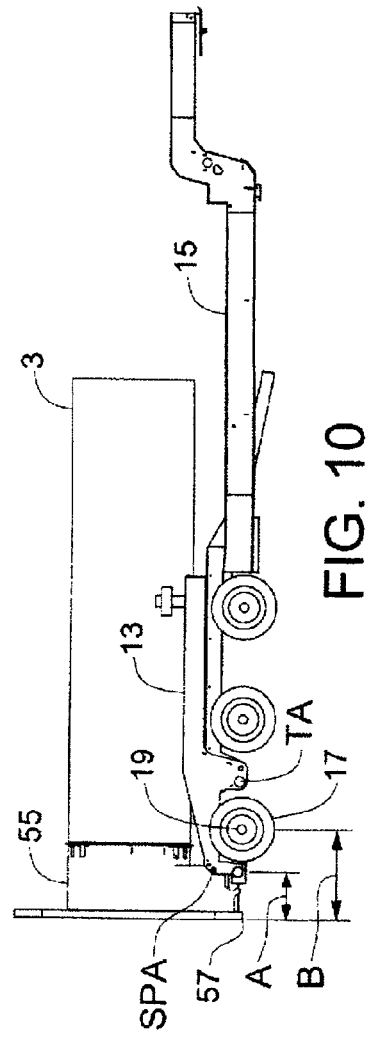

TRANSPORT APPARATUS FOR ELONGATE OBJECTS

This invention is in the field of transporting large elongated objects such as are typically transported in a horizontal orientation and then raised to a vertical working position at a work site, and in particular a trailer and base that releasably connect to transport, raise, and lower the object.

BACKGROUND

In many industries it is required to set up an array of equipment at a temporary work site, and then disassemble the installation, move it to another work site, and re-assemble it. For example asphalt and concrete plants are often set up in locations where large quantities of material are required for road or building construction. Similarly in the oil and gas industry, an array of equipment is set up at a well location for drilling or servicing, then taken down and moved to a different well location.

These equipment arrays typically include various tanks, bins, silos, and the like for water, asphalt, sand, cement, and other materials such as might be required at any particular work site. These are transported to the work site, often in a lowered horizontal transport orientation, and then raised to a vertical working orientation at the work site. For example bins containing dry material especially are often elongated vertically when in a working position to maximize the quantity of material stored above a hoppered bottom such that the dry material will flow out by gravity.

This vertical orientation also reduces the ground area, or footprint, occupied by the installation. For example in well drilling installations it is necessary to have a number of different materials located in proximity to the well being drilled, and the vertical orientation of tanks and bins facilitates such proximity. In other installations it may also be desirable to minimize the area occupied.

Bins and tanks are typically carried by flat bed trucks or trailers to the work site. The trailer is maneuvered into position, and then the bin is raised from the horizontal transport position to a vertical working position resting on the ground, and the trailer is moved away from the site. A loader machine or crane can be used, or in some cases the trailer itself may tilt up to the vertical, or near vertical position. Tipping and dumping vehicles are well known for a wide variety of purposes where the load carried is tilted upward from a substantially horizontal transport position.

U.S. Pat. No. 4,163,626 to Batterton et al. for example discloses an erection means for a transport trailer. A large object such as a bin is carried on a flatbed trailer in a horizontal orientation. The bin is pivotally attached to the rear end of the trailer, and actuators bear against the bin and trailer to pivot the bin up to the vertical position. The bin can then be disconnected from the trailer and actuators and the trailer is driven away. U.S. Pat. No. 7,214,028 to Boassa et al. discloses a similar trailer for carrying a bin inn the horizontal orientation and then tilting same up to a vertical orientation.

SUMMARY OF THE INVENTION

It is an object of the present invention to provide a trailer apparatus for carrying elongate objects in a horizontal orientation and then raising the object to a vertical orientation, wherein the apparatus overcomes problems in the prior art.

The present invention provides a transport apparatus for moving an elongated object, where the elongated object is oriented substantially vertically when in a working position resting on a ground surface. The apparatus comprises a trailer comprising an elongated trailer frame with a hitch at a front end thereof. The trailer frame comprises a tilting rear frame section pivotally attached to a front frame section about a substantially horizontal tilt axis oriented substantially perpendicular to an operating travel direction of the trailer. Rear wheels are mounted on a rear axle under the tilting rear frame section rearward of the tilt axis, and an actuator is operative to pivot the tilting rear frame section upward about the tilt axis from a substantially horizontal lowered position to a substantially vertical raised position. An engagement mechanism is mounted on a rear end of the tilting rear frame section rearward of the rear wheels, and a receiver is mounted on a lower portion of the elongated object, and wherein the engagement mechanism is configured to pivotally engage the receiver when the elongated object is in the working position such that activating the actuator to move the tilting rear frame section upward from the lowered position moves the engagement mechanism downward into engagement with the receiver, and such that the tilting rear frame section moves upward to the raised position adjacent to a front side of the elongated object, and the rear wheels are raised above the ground. A lock is operative to secure the front side of the elongated object to the tilting rear frame section when the tilting rear frame section is in the raised position such that activating the actuator to move the tilting rear frame section downward to the lowered position moves the elongated object downward to a substantially horizontal transport position resting on the trailer frame supported on the rear wheels.

The invention reduces the forces required to raise and lower the elongated object, and reduces the weight of the trailer.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 5-7 are side views of the embodiment of FIG. 1 with the tilting rear frame section at progressively higher intermediate positions between the lowered position of FIG. 2 and the fully raised position;

FIG. 8 is a side view of the embodiment of FIG. 1 with the tilting rear frame section in the fully raised position;

FIG. 9 is a side view of the embodiment of FIG. 1 with the tilting rear frame section and secured elongated object in a partially lowered position;

FIG. 10 is side view of the embodiment of FIG. 1 with the tilting rear frame section and secured elongated object in the lowered position with the elongated object supported on the trailer frame in a horizontal orientation;

DETAILED DESCRIPTION OF THE ILLUSTRATED EMBODIMENTS

Figure 1:
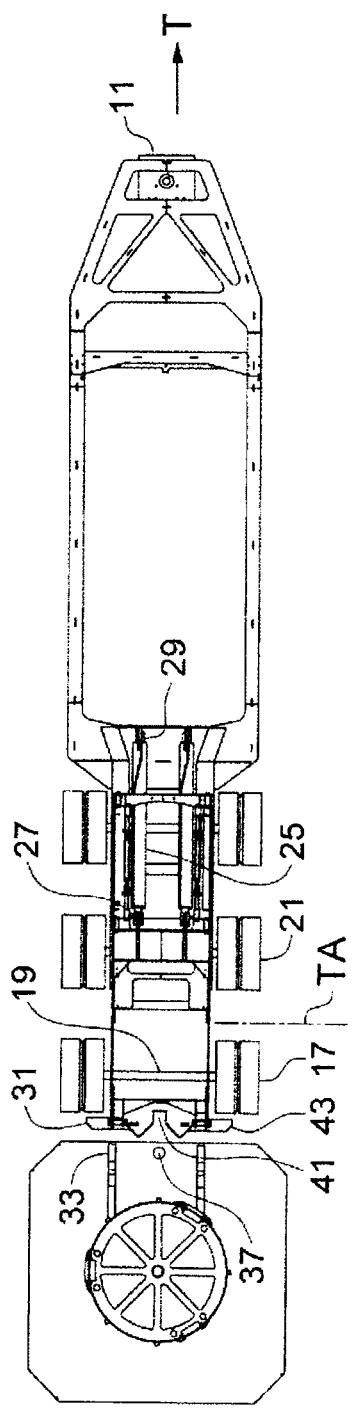
FIG. 1 is a top view of an embodiment of a transport apparatus of the present invention with the trailer thereof backed up adjacent to the elongated object to be moved, and with the tilting rear frame section in the lowered position.

FIGS. 1-10 illustrate an embodiment of a transport apparatus 1 of the present invention for moving an elongated object 3, where the elongated object 3 is oriented substantially vertically when in a working position resting on a ground surface 5. The elongated object 3 will typically be a container such as a bin or tank that is transported in a horizontal orientation and then moved to a vertical working position when at the work site.

The apparatus 1 comprises a trailer 7 comprising an elongated trailer frame 9 with a hitch 11 at a front end thereof for attachment to a highway tractor or like towing vehicle. The trailer frame 9 comprises a tilting rear frame section 13 pivotally attached to a front frame section 15 about a substantially horizontal tilt axis TA oriented substantially perpendicular to an operating travel direction T of the trailer 7.

In the illustrated apparatus 1, rear wheels 17 are mounted on a rear axle 19 under the tilting rear frame section 13 rearward of the tilt axis TA, and forward wheels 21 are mounted on forward axles 23 under the front frame section 15 forward of the tilt axis TA. The illustrated trailer 7 thus has three axles supporting the rear portion thereof as is known in the art, with two axles forward of the tilt axis and a single axis rearward of the tilt axis TA.

Figure 2:
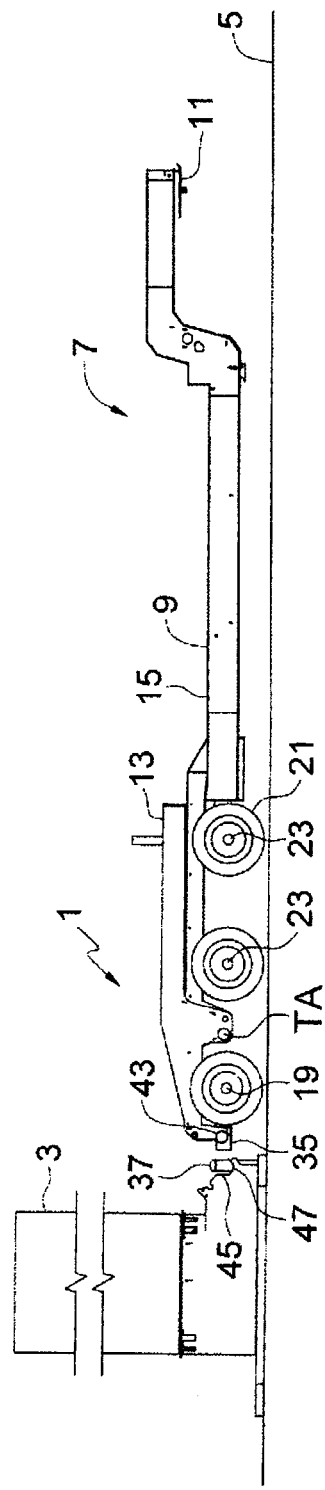
FIG. 2 is a side view of the embodiment of FIG. 1 in the position of FIG. 1.

An actuator is operative to pivot the tilting rear frame section 13 upward about the tilt axis TA from a substantially horizontal lowered position, as shown in FIG. 2 to a substantially vertical raised position as shown in FIG. 8.

In the illustrated apparatus 1, the tilting rear frame section 13 extends forward of the tilt axis TA over the front frame section 15 when in the lowered position. The actuator comprises a pair of extendable hydraulic cylinders 25 pivotally attached at rearward ends 27 thereof to the tilting rear frame section 13 forward of the tilt axis TA, and pivotally attached at a forward ends 29 thereof to the front frame section 15.

An engagement mechanism 31 is mounted on a rear end of the tilting rear frame section 13 rearward of the rear wheels 17, and a receiver 33 is mounted on a lower portion of the elongated object 3. The engagement mechanism 31 is configured to pivotally engage the receiver 33 when the elongated object 3 is in the working position. A centering mechanism 35 is also mounted on the rear end of the tilting rear frame section 13 and is operative to engage a vertical guide post 37 on the elongated object 3 when the elongated object is in the working position.

Figure 3:
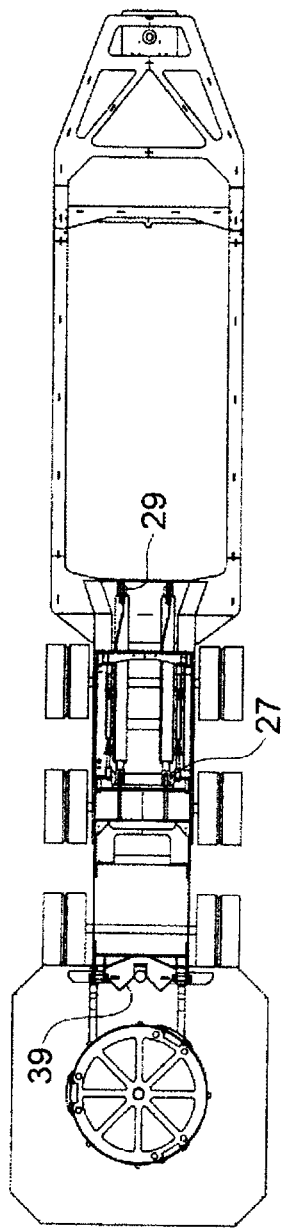
FIG. 3 is a top view of the embodiment of FIG. 1 with the trailer backed up further such that the centering mechanism is engaged and the elongated object is centered with respect to the trailer.
Figure 4:
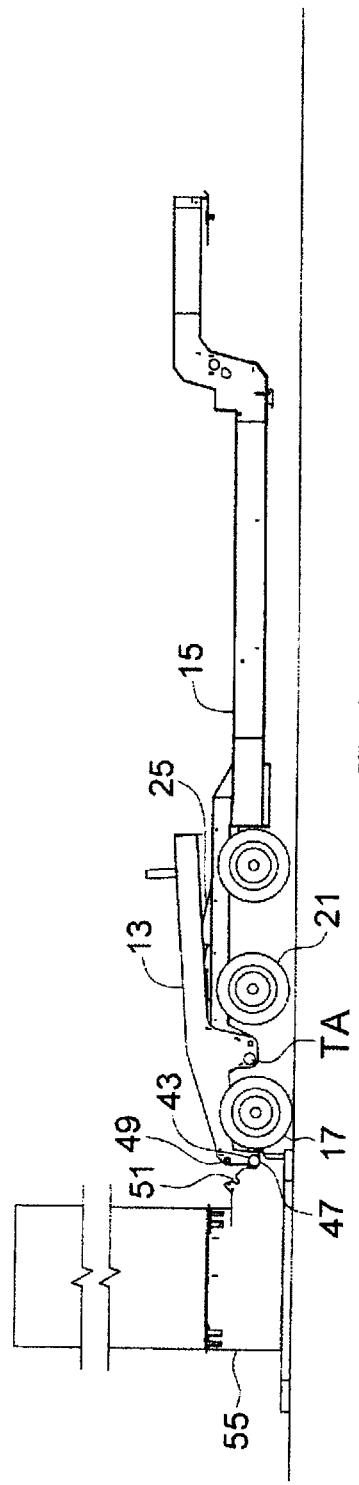
FIG. 4 is a side view of the embodiment of FIG. 1 in the position of FIG. 3 with the tilting rear frame section partially raised to engage the engagement mechanism with the receiver.

FIGS. 1 and 2 show the trailer 7 has been backed up adjacent to the elongated object 3 before engagement. The illustrated centering mechanism 35 is provided by a V-shaped receptacle 39 with a center recess 41. It can be seen that if the trailer 7 is not quite aligned with the center of the elongated object 3, the guide post 37 will contact one of the sloping sides of the V-shaped receptacle 39 as the trailer 7 is moved rearward. The trailer 7 and or elongated object 3 will shift in response to the forces exerted between the guide post 37 and V-shaped receptacle 39 as required until the guide post 37 enters the center recess 41, as shown in FIGS. 3 and 4.

The engagement mechanism 31 comprises horizontal cylindrical main shafts 43 that are located on the rear end of the tilting rear frame section 13. These are located fairly low and can be configured to provide the impact zone that is required in many jurisdictions to prevent low vehicles from driving under the trailer. The main shafts 43 are configured such that when the guide post 37 enters the center recess 41 of the V-shaped receptacle 39, the main shafts bear against the front faces 45 of the receiver 33.

Thus centering of the elongated object 3 with respect to the trailer 7 is accomplished by the guide post 37 bearing against the sloping sides of the V-shaped receptacle 39 as the trailer 7 is moved rearward, and similarly if the trailer 7 and elongated object 3 are not oriented squarely with respect to each other, the trailer 7 and/or elongated object 3 will shift as required during rearward movement of the trailer 7 so that the main shafts 43 on each side are bearing against the front faces 45 of the receiver 33 on each side, and the desired square orientation is achieved.

Once this square orientation is achieved with the main shafts 43 on each side bearing against the front faces 45 of the receiver 33 on each side, the actuator, hydraulic cylinders 25, are activated to move the tilting rear frame section 13 upward from the lowered position. Moving the tilting rear frame section 13 upward moves the main shafts 43 of the engagement mechanism 31 downward into engagement with main grooves 47 of the receiver 33. FIG. 4 shows the tilting rear frame section 13 moved upward to the point where the main shafts 43 have moved down into engagement with the main grooves 47 of the receiver 33 and so the tilting rear frame section 13 pivots with respect to the elongated object 3 about a main pivot axis MPA provided by the main shafts rotating in the main grooves 47 of the receiver 33. At this point the transmission of towing vehicle is generally placed in a neutral with the brakes released such that the trailer and towing vehicle can move as they are pulled or pushed by the hydraulic cylinders 25 acing on the trailer frame 9.

Extending the hydraulic cylinder 25 further moves the tilting rear frame section 13 upward through the intermediate positions of FIGS. 5-7 to the raised position of FIG. 8 adjacent to a front side of the elongated object 3. The wheels 17, 21 are raised above the ground with the weight of the trailer 7 carried on the receiver 33, thus ensuring a secure engagement of the receiver and the engagement mechanism 31. For example the connection at the hitch 11 can twist somewhat in uneven ground conditions to ensure both main shafts 43 are engaged.

The engagement mechanism 31 and receiver 33 can be configured to pivot with respect to each other about a single pivot axis, as described below, however in the illustrated apparatus 1, the engagement mechanism 31 further comprises horizontal and cylindrical secondary shafts 49 located above the main shafts 43, and the receiver includes secondary grooves 51. When the tilting rear frame section 13 has moved upward to the intermediate position of FIG. 6, the secondary shafts 49 are engaged in the secondary grooves 51 of the receiver 33, and main shafts 43 are still in engagement with the main grooves 47. As the tilting rear frame section 13 moves further upward, the main shafts 43 move out of the main grooves 47 and the tilting rear frame section 13 pivots with respect to the elongated object 3 about a secondary pivot axis SPA provided by the secondary shafts 49 rotating in the secondary grooves 51 of the receiver 33 as illustrated in FIG. 7.

Once the tilting rear frame section 13 is in the raised position of FIG. 8 adjacent to a front side of the elongated object 3, a lock 53 is operative to secure the front side of the elongated object 3 to the tilting rear frame section 13. Activating the actuator hydraulic cylinders 25 to move the tilting rear frame section 13 downward toward the lowered position moves the elongated object 3 downward through the intermediate position of FIG. 9 to the substantially horizontal transport position of FIG. 10 resting on the trailer frame 9 and supported on the forward and rear wheels 21, 17.

It is contemplated that, subject to weight restrictions, virtually any type of elongated object, such as tanks, bins, silos, and the like could be mounted on a base 55 that would provide the receiver 33.

Locating the tilt axis TA forward of the rear wheels 17 provides for some mechanical advantages when raising the elongated object 3 from the horizontal transport position of FIG. 10. In a conventional pivotal attachment for transporting and moving an elongated object, the pivotal connection is at the rear of the trailer, about where the secondary pivot axis is shown in FIG. 10 such only a short portion A of the elongated object 3 is located rearward of the pivotal connection to act as a counter weight, providing a downward moment about the axis SPA that reduces the initial force needed to be exerted by the actuator hydraulic cylinders 25 to begin to raise the elongated object 3 from the horizontal position shown in FIG. 10.

In contrast in the illustrated apparatus 1, the initial pivot axis when the actuator hydraulic cylinders 25 begin to raise the elongated object 3 from the horizontal position shown in FIG. 10 is at the rear axle 19, such that a significantly longer portion B of the elongated object 3 is located rearward of the pivotal axis to act as a counter weight, providing a downward moment about the rear axle 19. As the tilting rear frame section 13 is raised further the front edge 57 of the base 55 contacts the ground, the rear wheels 17 are raised above the ground, and the hydraulic cylinders 25 exert a moment force about the tilt axis TA.

The overall weight of the trailer 7 is also reduced by utilizing the tilting rear frame section 13 as a functional part of the trailer frame 9. Conventionally such tilting frames are simply added weight not utilized, and therefore reduce the payload of the trailer.

Figure 11:
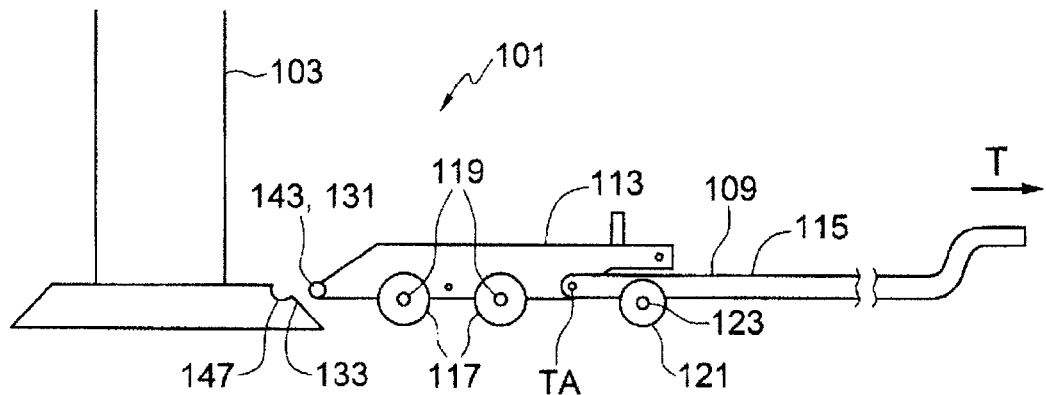
FIG. 11 is a side view a different embodiment of a transport apparatus of the present invention with the trailer thereof backed up adjacent to the elongated object to be moved, and wherein the engagement mechanism and receiver provide a single pivot axis, and with the tilting rear frame section in the lowered position.
Figure 12:
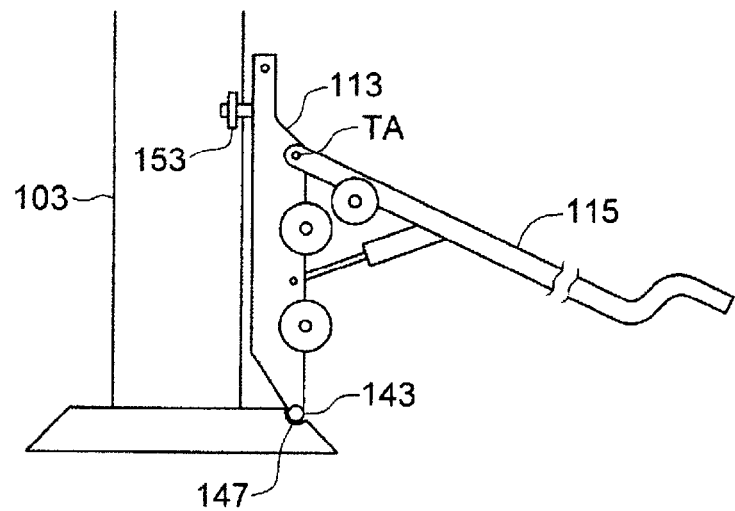
FIG. 12 is a side view of the embodiment of FIG. 11 with the tilting rear frame section in the raised position secured to the elongated object.

FIGS. 11 and 12 schematically illustrate an alternate embodiment of the transport apparatus 101 of the present invention where the elongated trailer frame 109 comprises a tilting rear frame section 113 pivotally attached to a front frame section 115 about a substantially horizontal tilt axis TA oriented substantially perpendicular to an operating travel direction T. Again the rear of the trailer frame is supported by wheels on three separate axles however here the rear wheels 117 are mounted on two separate rear axles 119 under the tilting rear frame section 113 rearward of the tilt axis TA, and a single forward axle 123 with forward wheels 121 is mounted under the front frame section 115 forward of the tilt axis TA. This configuration may be advantageous in some circumstances.

The engagement mechanism 131 is mounted on a rear end of the tilting rear frame section 113 rearward of the rear wheels 117, and a receiver 133 is mounted on a lower portion of the elongated object 103. The main shafts 143 of engagement mechanism 131 are configured to pivotally engage the main grooves 147 of the receiver 133 and allow the tilting rear frame section 113 to be moved from the lowered position of FIG. 11 to the raised position of FIG. 12 while pivoting on the main pivot axis provided by the main shafts 143 engaged in the main grooves 147. The lock 153 can then be engaged to bring the elongated object 103 down to the horizontal position supported on the trailer frame 109 for transport.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A transport apparatus for moving an elongated object, where the elongated object is oriented substantially vertically when in a working position resting on a ground surface, the apparatus comprising:
   a trailer comprising an elongated trailer frame with a hitch at a front end thereof;
   the trailer frame comprising a tilting rear frame section pivotally attached to a front frame section about a substantially horizontal tilt axis oriented substantially perpendicular to an operating travel direction of the trailer;
   front trailer wheels supporting the front frame section;
   rear wheels mounted on a rear axle, the rear axle attached to and under the tilting rear frame section rearward of the tilt axis;
   an actuator operative to pivot the tilting rear frame section upward about the tilt axis from a substantially horizontal lowered position to a substantially vertical raised position;
   an engagement mechanism mounted on a rear end of the tilting rear frame section rearward of the rear wheels;
   a receiver mounted on a lower portion of the elongated object, and wherein when the elongated object is in the working position and the engagement mechanism is aligned with the receiver, activating the actuator moves the tilting rear frame section upward from the lowered position and moves the engagement mechanism downward into pivotal engagement with the receiver as the tilting rear frame section moves upward to the raised position adjacent to a front side of the elongated object, and when the engagement mechanism is pivotally engaged with the receiver the front and rear wheels move upward off the ground;
   a lock operative to secure the front side of the elongated object to the tilting rear frame section when the tilting rear frame section is in the raised position such that activating the actuator to move the tilting rear frame section downward to the lowered position moves the elongated object downward to a substantially horizontal transport position resting on the trailer frame supported on the rear wheels.

2. The apparatus of claim 1 further comprising a substantially vertically oriented centering post mounted on the rear end of the tilting rear frame section operative to engage a V-shaped guide on the elongated object when the elongated object is in the working position such that when the engagement mechanism is engaged, the elongated object is centered with respect to the trailer frame.

3. The apparatus of claim 1 wherein the tilting rear frame section extends forward of the tilt axis over the front frame section when in the lowered position, and wherein the actuator comprises an extendable hydraulic cylinder pivotally attached at a rearward end thereof to the tilting rear frame section forward of the tilt axis, and pivotally attached at a forward end thereof to the front frame section.

4. The apparatus of claim 1 wherein the elongated object is mounted on a base, and wherein the receiver is mounted to the base.

5. A transport apparatus for moving an elongated object, where the elongated object is oriented substantially vertically when in a working position resting on a ground surface, the apparatus comprising:
   a trailer comprising an elongated trailer frame with a hitch at a front end thereof;
   the trailer frame comprising a tilting rear frame section pivotally attached to a front frame section about a substantially horizontal tilt axis oriented substantially perpendicular to an operating travel direction of the trailer;
   front trailer wheels supporting the front frame section;
   rear wheels mounted on a rear axle attached to the tilting rear frame section rearward of the tilt axis to support the rear frame section;
   an actuator operative to pivot the tilting rear frame section upward about the tilt axis from a substantially horizontal lowered position to a substantially vertical raised position;
   an engagement mechanism mounted on a rear end of the tilting rear frame section rearward of the rear wheels;
   a receiver mounted on a lower portion of the elongated object;
   wherein when the elongated object is in the working position and the engagement mechanism is aligned with the receiver, activating the actuator moves the tilting rear frame section upward from the lowered position, and moves the engagement mechanism downward into pivotal engagement with the receiver as the tilting rear frame section moves upward to the raised position adjacent to a front side of the elongated object, and when the engagement mechanism is pivotally engaged with the receiver the front and rear wheels move upward off the ground;
   a lock operative to secure the front side of the elongated object to the tilting rear frame section when the tilting rear frame section is in the raised position such that activating the actuator to move the tilting rear frame section downward to the lowered position moves the elongated object downward to a substantially horizontal transport position resting on the trailer frame supported on the rear wheels.

6. The apparatus of claim 5 further comprising a post mounted on the rear end of the tilting rear frame section, the post operative to engage a V-shaped guide on the elongated object when the elongated object is in the working position such that when the post and V-shaped guide are engaged, the elongated object is centered with respect to the trailer frame.

7. The apparatus of claim 6 wherein the engagement mechanism further comprises a shaft oriented substantially parallel to the tilt axis and located on the rear end of the tilting rear frame section, and the receiver defines a substantially vertically oriented front face, wherein the engagement mechanism is aligned with the receiver when the shaft bears against the front face along a length thereof.

8. The apparatus of claim 7 wherein the receiver comprises a groove along a bottom edge of the front face, and wherein as the actuator moves the tilting rear frame section upward, the shaft moves down into the groove and bears downward on the groove.

9. The apparatus of claim 7 wherein the tilting rear frame section extends forward of the tilt axis over the front frame section when in the lowered position, and wherein the actuator comprises an extendable hydraulic cylinder pivotally attached at a rearward end thereof to the tilting rear frame section forward of the tilt axis, and pivotally attached at a forward end thereof to the front frame section.

10. The apparatus of claim 7 wherein the elongated object is mounted on a base, and wherein the receiver is mounted to the base.

* * * * *